(12) United States Patent
Bress

(10) Patent No.: US 12,363,374 B2
(45) Date of Patent: *Jul. 15, 2025

(54) DEVICE ANALYSIS FOR SUPPLEMENTAL CONTENT EXPOSURE

(71) Applicant: Comcast Cable Communications, LLC, Philadelphia, PA (US)

(72) Inventor: Robert Bress, New Providence, NJ (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/170,891

(22) Filed: Feb. 9, 2021

(65) Prior Publication Data

US 2021/0168434 A1   Jun. 3, 2021

Related U.S. Application Data

(63) Continuation of application No. 16/661,570, filed on Oct. 23, 2019, now Pat. No. 10,945,025.

(51) Int. Cl.
*H04N 21/431* (2011.01)
*H04N 21/2668* (2011.01)
(Continued)

(52) U.S. Cl.
CPC ..... *H04N 21/4316* (2013.01); *H04N 21/2668* (2013.01); *H04N 21/4532* (2013.01); *H04N 21/812* (2013.01)

(58) Field of Classification Search
CPC .......... H04N 21/4316; H04N 21/2668; H04N 21/4532; H04N 21/812; H04N 21/251;
(Continued)

(56) References Cited

U.S. PATENT DOCUMENTS 8,255,949 B1 * 8/2012 Bayer ................. H04N 21/812
725/35
8,352,981 B1 * 1/2013 Oztaskent ............. G06Q 30/02
725/34

(Continued)

OTHER PUBLICATIONS

US Patent Application filed Oct. 23, 2019, entitled "Device Analysis for Supplemental Content Exposure", U.S. Appl. No. 16/661,570.

(Continued)

*Primary Examiner* — Junior O Mendoza
(74) *Attorney, Agent, or Firm* — BakerHostetler

(57) ABSTRACT

A content provider may receive an indication for supplemental content to be output to a target audience, determine a first content item to be viewed by the target audience based on one or more characteristics of the target audience, and may send an indication for the supplemental content to be output at a time associated with the output of the first content item. The content provider may determine a quantity of devices which output the supplemental content for a first time and may determine that this quantity of devices is below a target quantity of devices to output the supplemental content for the first time during a particular time period. The content provider may determine a second content item to be viewed by the target audience and may send an indication for the supplemental content to be output at a time associated with output of the second content item.

38 Claims, 8 Drawing Sheets

(51) Int. Cl.
  *H04N 21/45* (2011.01)
  *H04N 21/81* (2011.01)
(58) Field of Classification Search
  CPC .......... H04N 21/252; H04N 21/25891; H04N 21/25866; H04N 21/44204; H04N 21/44222; H04N 21/466; H04N 21/4667; H04N 21/4668; H04N 21/25883; H04N 21/6582; H04N 21/23424; H04N 21/25841; H04N 21/26241; H04N 5/2723; G06Q 30/02; G06Q 30/0241; G06Q 30/0242; G06Q 30/0271; G06Q 30/0272; G06Q 30/0276; G06Q 30/0277; H04H 20/106; H04H 60/375; H04H 60/31; H04M 3/4878; Y04S 50/14
  See application file for complete search history.

(56) References Cited

U.S. PATENT DOCUMENTS

| | | | |
|---|---|---|---|
| 10,757,462 | B2 | 8/2020 | Lykes et al. |
| 10,945,025 | B1* | 3/2021 | Bress ................ H04N 21/6582 |
| 11,012,758 | B2 | 5/2021 | Lieberman et al. |
| 11,057,134 | B2 | 7/2021 | Lykes et al. |
| 2007/0157228 | A1* | 7/2007 | Bayer ................ H04N 21/435 348/E7.071 |
| 2007/0219859 | A1 | 9/2007 | Huntington |
| 2009/0172724 | A1 | 7/2009 | Ergen et al. |
| 2010/0088714 | A1* | 4/2010 | Hawkins .......... H04N 21/26603 725/14 |
| 2010/0269134 | A1* | 10/2010 | Storan ................ G06Q 30/02 725/34 |
| 2010/0325666 | A1* | 12/2010 | Wiser ................ H04N 21/6338 725/44 |
| 2012/0124606 | A1* | 5/2012 | Tidwell ................ H04L 7/0054 725/17 |
| 2012/0232999 | A1 | 9/2012 | Roberts et al. |
| 2012/0278161 | A1* | 11/2012 | Lazzaro ............ G06Q 30/0251 705/14.45 |
| 2013/0325636 | A1* | 12/2013 | Carter ................ G06Q 30/0277 705/14.71 |
| 2014/0237498 | A1* | 8/2014 | Ivins ...................... G06Q 30/02 725/14 |
| 2014/0278914 | A1* | 9/2014 | Gurumoorthy .... G06Q 30/0243 705/14.42 |
| 2016/0150289 | A1* | 5/2016 | Lee ...................... H04N 21/4532 725/5 |
| 2018/0091868 | A1* | 3/2018 | Borok ................ H04N 21/4622 |
| 2019/0034980 | A1 | 1/2019 | Bennett et al. |
| 2019/0364325 | A1* | 11/2019 | Anderson ............ H04N 21/812 |
| 2020/0036462 | A1* | 1/2020 | Grancharov ....... H04N 21/2547 |
| 2020/0108316 | A1* | 4/2020 | Nay .................... H04N 21/2187 |
| 2020/0204279 | A1 | 6/2020 | Lykes et al. |
| 2020/0204847 | A1 | 6/2020 | Lykes et al. |
| 2020/0374599 | A1 | 11/2020 | Lykes et al. |
| 2020/0404390 | A1 | 12/2020 | Lieberman et al. |
| 2021/0337254 | A1 | 10/2021 | Lykes et al. |
| 2022/0272407 | A1* | 8/2022 | Bress .................. H04N 21/812 |

OTHER PUBLICATIONS

Becky J., "Viamedia Announces QTT™ Advanced Technology to Accelerate Spot Cable TV Advertising Sales Growth," Jul. 29, 2019, Viamedia advanced technology, pp. 1-2, retrieved at https://blog.viamediatv.com/viamedia-announces-qtt-advanced-technology-to-accelerate-spot-cable-tv-advertising-sales-growth.

Becky, J., "Viamedia debuts placeLOCAL™ and SpotHop™ for Local Account Sellers," Jul. 26, 2017, Viamedia advanced technology, pp. 1-6, retrieved at https://blog.viamediatv.com/viamedia-debuts-placelocal-spothop-local-account-sellers.

Becky, J., "Viamedia Launches Advanced Multi-Screen Mobile Ad Innovation for Audience and Impression-Based Selling," Sep. 15, 2016, Viamedia advanced technology, pp. 1-6, retrieved at https://blog.viamediatv.com/viamedia-launches-mobile-ad-innovations.

US Patent Application filed Feb. 10, 2022, entitled "Device Analysis for Supplemental Content Exposure", U.S. Appl. No. 17/668,685.

* cited by examiner

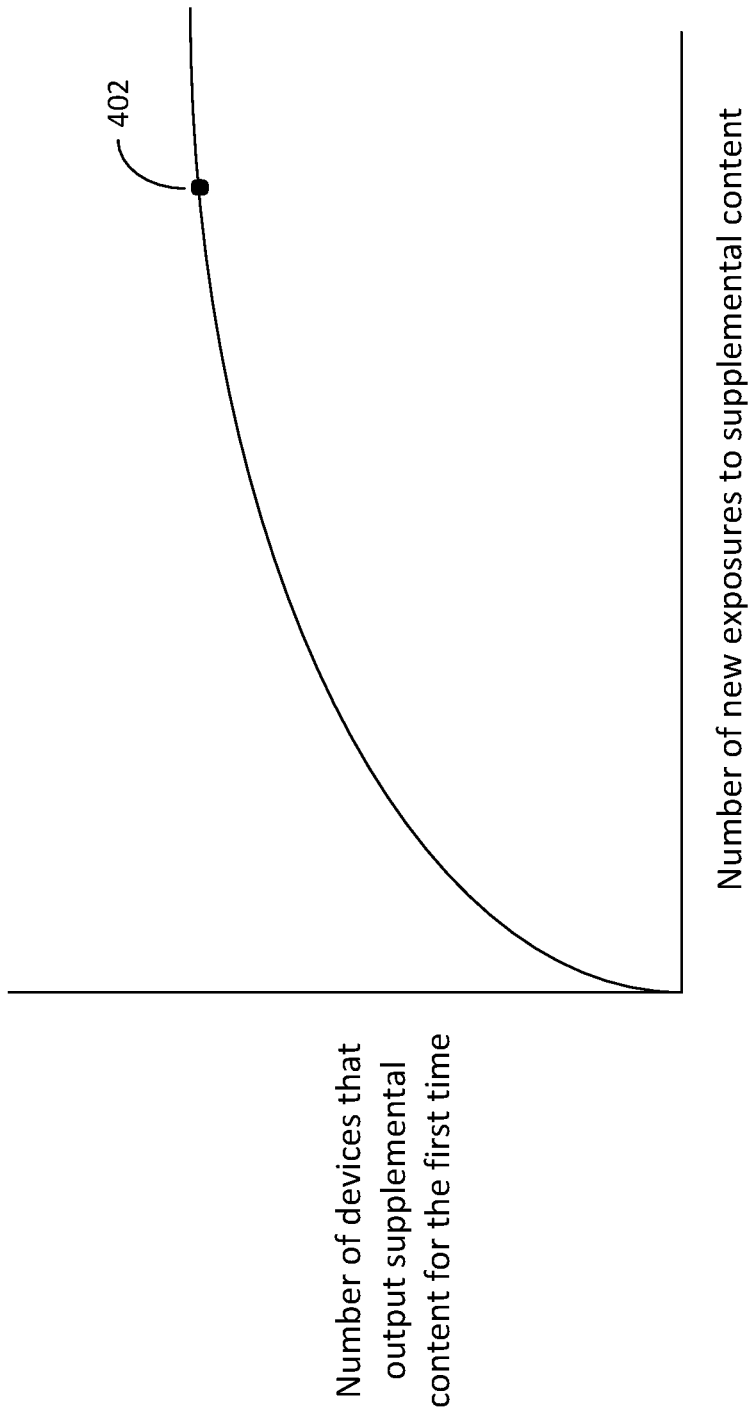

DEVICE ANALYSIS FOR SUPPLEMENTAL CONTENT EXPOSURE

CROSS REFERENCE TO RELATED APPLICATIONS

This application is a continuation application of U.S. patent Ser. No. 16/661,570, filed Oct. 23, 2019, which is hereby incorporated by reference in its entirety.

BACKGROUND

Content providers may make supplemental content available for output by one or more devices such as set-top boxes, mobile telephones and tablets. The supplemental content may comprise one or more advertisements for products or services offered by third parties or by the content providers themselves. The supplemental content may be output during the presentation of one or more other types of content including movies and television shows such that it may be viewed by one or more audience members. It may be desirable to improve the likelihood that the supplemental content will be viewed by one or more target audience members that are most likely to be interested in viewing the supplemental content.

SUMMARY

Methods and systems are described for improving supplemental content exposure. A content provider may receive an indication for supplemental content to be output to a target audience, determine a first content item to be viewed by the target audience based on one or more characteristics of the target audience, and may send an indication for the supplemental content to be output at a time associated with the output of the first content item, such as during an advertising break of the first content item. The content provider may determine a quantity of devices which output the supplemental content for a first time and may determine that this quantity of devices is below a target quantity of devices to output the supplemental content for the first time during a particular time period. Based on determining that the quantity of devices is below the target quantity of devices, the content provider may determine a second content item to be viewed by the target audience and may send an indication for the supplemental content to be output at a time associated with output of the second content item.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIGS. 4A and 4B show example graphs.

DETAILED DESCRIPTION OF ILLUSTRATIVE EMBODIMENTS

Figure 1:
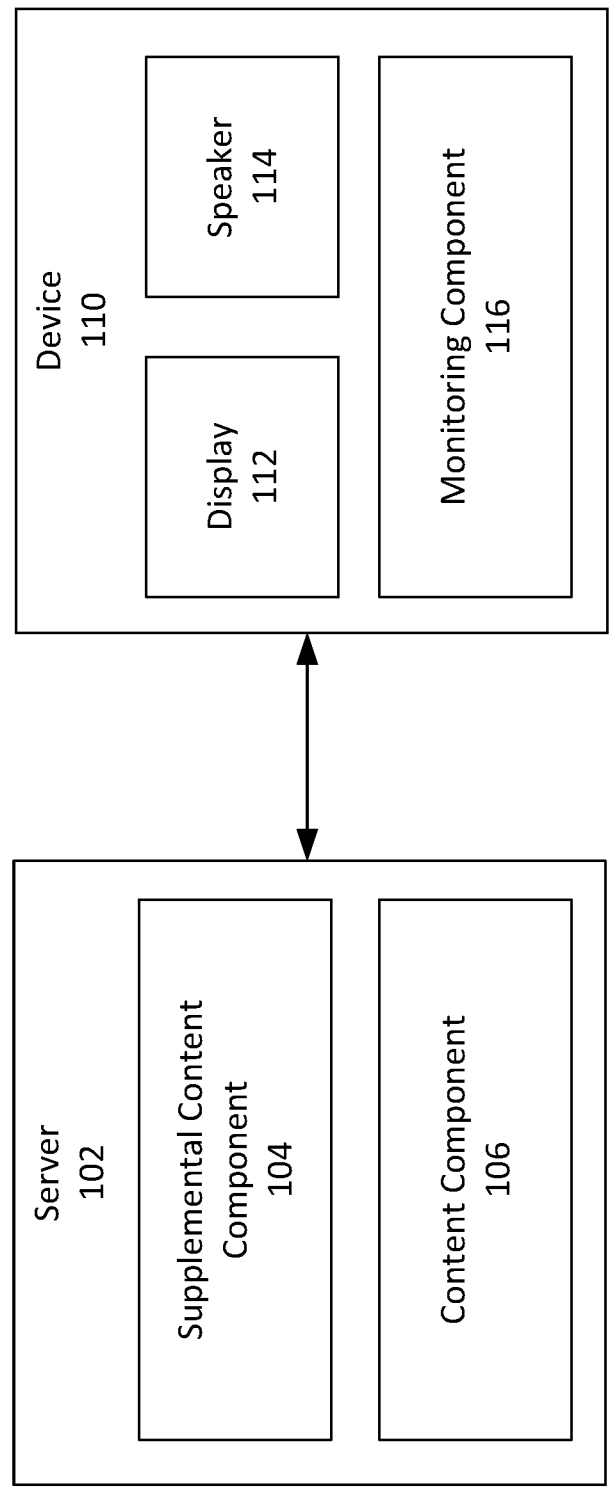
FIG. 1 shows a block diagram of an example system.

Content providers may make content such as television and movie content available for playback to one or more viewers or audience members. A content provider may additionally or alternatively determine to cause output of supplemental content to the one or more audience members. The supplemental content may comprise one or more advertisements, such as advertisements for clothing, electronics, upcoming television and movie releases, as well as products and services offered by the content providers themselves. It is understood that the supplemental content may comprise any type of content that is capable of being output to the one or more viewers or audience members.

Supplemental content output may not be optimized in a system where the content provider is unaware of the type of audience members that are most likely to be interested in the supplemental content. For example, supplemental content relating to adult men's apparel is not likely to be of interest to a demographic of young girls between the ages of 6-12. Thus, outputting supplemental content related to adult men's apparel during a first type of content that is typically viewed by young girls between the ages of 6-12 would not lead to a maximum number of desired exposures. However, outputting that same content during a football game that is typically viewed by males between the ages of 18-35 may maximize the number of desired exposures to that same supplemental content.

It may therefore be desirable for the content provider to have awareness of the type of audience members most likely to be interested in the supplemental content, and to output that supplemental content during output of one or more types of content that are most likely to be viewed by the particular audience members (e.g., target audience members). It may be desirable for the content provider to have awareness of whether or not the supplemental content has actually been viewed by the target audience members, such as by using set-top box data associated with the target audience members, and to determine one or more other types of content that are typically viewed by the target audience members in order to maximize a number of desired exposures to the supplemental content.

As described herein, a content provider may determine a target audience for outputting supplemental content based on one or more characteristics of the target audience and/or one or more characteristics of the supplemental content. The content provider may determine a first type of content associated with the target audience, such as a first type of content that is likely to be viewed by the target audience or a genre of content that is typically viewed by the target audience, and may cause the supplemental content to be output during output of the first type of content. The content provider may receive viewership information associated with the target audience and may determine that a rate of new exposures of the supplemental content to the audience members is below a threshold. The rate of new exposure of the supplemental content may be based on the number of devices outputting the supplemental content for the first time. Based on this determination, the content provider may determine a second type of content associated with a portion of the target audience and may cause the supplemental content to be output during output of the second type of content. By tailoring the supplemental content to particular types of content during which the supplemental content will be output, content providers may ensure that the supplemental content is presented to a maximum number of desired members of the target audience.

FIG. 1 shows a block diagram of an example system 100. The system 100 may comprise a server 102 and a device 110. The server 102 may be configured to cause the device 110 to output content and/or supplemental content to one or more audience members. The server 102 may be a content provider, a content server, or any type of device or other entity capable of providing content and/or supplemental content to the device 110. The server 102 may comprise a supplemental content component 104 and a content component 106. The device 110 may be any device capable of outputting or displaying content and/or supplemental content to one or more audience members, including but not limited to set-top boxes, cellular telephones, tablets and personal computers. The device 110 may comprise a display 112, a speaker 114 and a monitoring component 116.

The supplemental content component 104 may be configured to determine supplemental content for outputting to a target audience. The target audience may comprise a minimum number of desired viewers or audience members for viewing the supplemental content. The supplemental content component 104 may receive information associated with a target audience and may determine one or more types of supplemental content that are likely to be of interest to that target audience. The supplemental content component 104 may determine an appropriate target audience for viewing or receiving the supplemental content. The target audience may be determined based on one or more characteristics of the target audience and/or one or more characteristics of the supplemental content. The target audience may be determined based on one or more demographics, including but not limited to age, race and gender.

The content component 106 may be configured to determine one or more types of content associated with the target audience. Determining one or more types of content associated with the target audience may comprise determining one or more types of content that are likely to be viewed by the target audience. Determining one or more types of content associated with the target audience may comprise determining one or more genres of content that are typically viewed by the target audience. The content component 106 may receive or access information associated with the target audience, such as information received from the device 110, and may determine based on the information associated with the target audience that a particular type of content is a popular viewing event associated with the target audience. The content component 106 may cause the supplemental content to be output during the one or more types of content associated with the target audience.

The content component 106 may receive viewership information (e.g., from the device 110) indicating whether or not the supplemental content was likely viewed or was actually viewed by one or more members of the target audience. The viewership information may comprise an indication of whether the supplemental content was output by the device for a first time. Based on receiving an indication from the device 110 that the supplemental content was not viewed by at least a portion of the target audience, the content component 106 may be configured to determine one or more other types of content that are likely to be viewed by the portion of the target audience. The content component 106 may be configured to determine the one or more other types of content that are likely to be viewed by the portion of the target audience based on one or more characteristics of the portion of the target audience that did not view the supplemental content. The content component 106 may cause the supplemental content to be output during the one or more other types of content associated with the target audience.

The display 112 of the device 110 may be configured to display or output content and/or supplemental content to the one or more audience members. The display 112 may be any device capable of displaying or outputting video or image content to an audience member, such as a tablet, a computer monitor, or a television screen. The display 112 may be part of the device 110 such as in the example that the device 110 is a tablet or a computer. The display 112 may be separate from the device 110 such as in an example that the device 110 is a set top box and the display 112 is a television screen in electrical communication with the set top box.

The speaker 114 may be configured to output audio associated with the content and/or the supplemental content. The speaker 114 may be any device capable of outputting audio content. The speaker 114 may be part of the device 110 such as in the example that the device 110 is streaming player or a tablet or a computer. The speaker 114 may be separate from the device 110 such as in an example that the device 110 is a set top box and the speaker 114 is a television or other external speaker in electrical communication with the set top box.

The monitoring component 116 may be configured to determine whether or not one or more members of the target audience have viewed the content and/or the supplemental content. The monitoring component 116 may be configured to determine whether the supplemental content was output by the display 112 and/or the speaker 114. The monitoring component 116 may send to the server 102 an indication of whether or not the supplemental content was viewed by the one or more members of the target audience. More specifically, the monitoring component 116 may send to the server 102 an indication of whether or not the supplemental content was output by the device 110 for a first time. The monitoring component 116 may send the indication based on either a determination that the supplemental content was output by the device 110 or based on a determination that the supplemental content was not output by the device 110. This indication may be used by the server 102 in adjusting the types of content during which the supplemental content will be output in order to maximize exposure of the supplemental content to the one or more target audience members.

Figure 2:
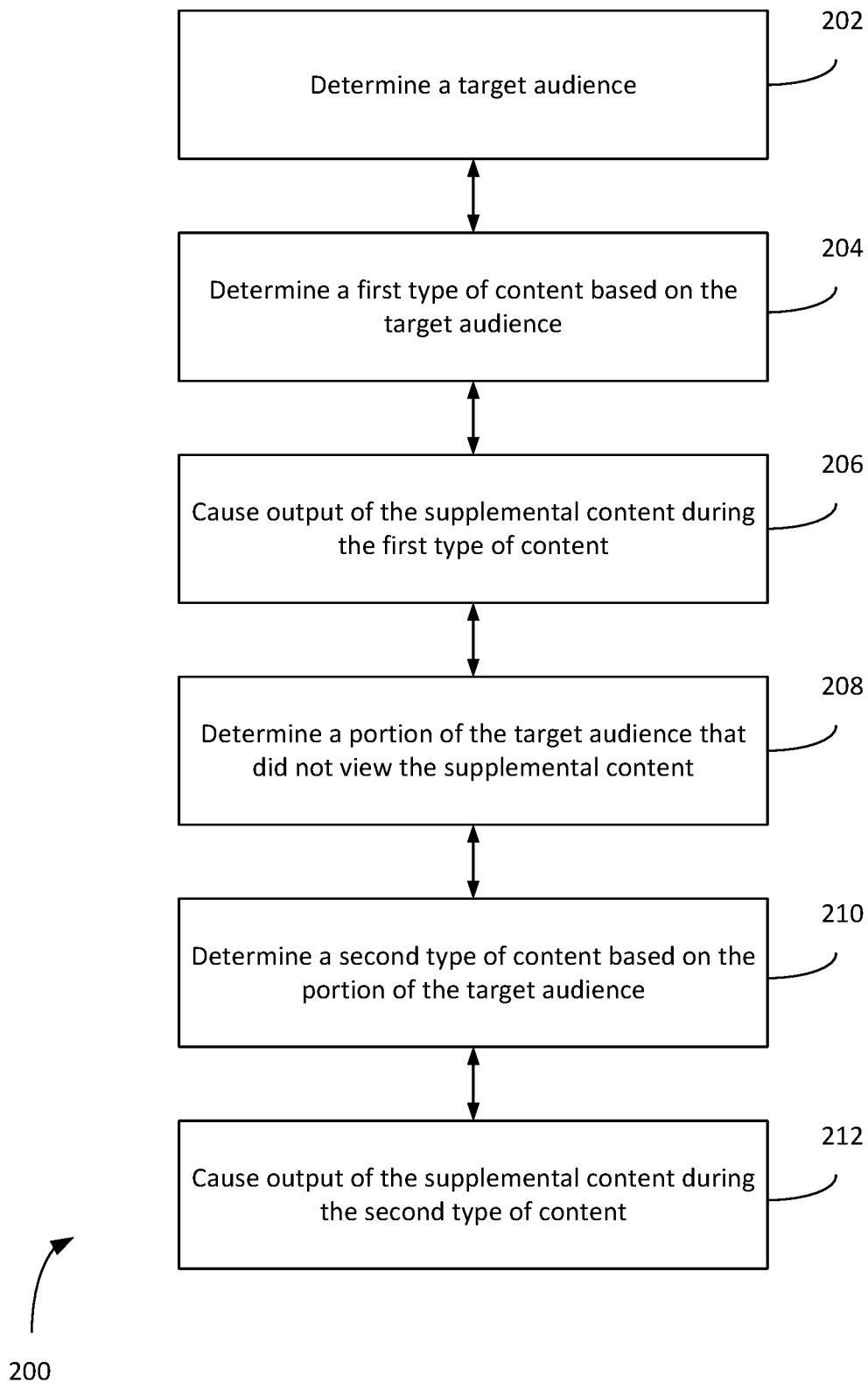
FIG. 2 shows a flow chart of an example method.

FIG. 2 shows a flow chart of an example method 200. At step 202, a target audience for viewing supplemental content may be determined. The target audience may be determined by the server 102 shown in FIG. 1. The target audience may comprise one or more audience members. The target audience may comprise a minimum number of desired viewers for the supplemental content. The target audience may be based on one or more demographics, including but not limited to age, race and gender. The target audience may be determined based on one or more characteristics of the supplemental content, including but not limited to the products or services contained or advertised in the supplemental content. An example supplemental content may comprise an advertisement for selling sports related merchandise, such as football jerseys. An example target audience may comprise males between the ages of 18-35. The target audience of males between the ages of 18-35 may be determined as the target audience that is most likely to purchase the sports related merchandise.

At step 204, a first type of content associated with the target audience may be determined. The first type of content associated with the target audience may be determined based on viewership information associated with the target audience. The viewership information may be received from one or more devices. The devices may be associated with the target audience, such as set-top boxes, mobile phones, tablets, and personal computers associated with the target audience. The viewership information may be determined based on stored information associated with the particular target audience. The viewership information may be determined based on any data associated with the target audience, including but not limited to data received from third parties.

Determining a first type of content associated with the target audience may comprise determining a first type of content that is likely to be viewed by the target audience. Determining the first type of content may comprise determining at least one of a particular television show, movie, or other type of content that is likely to be viewed by the target audience. In the example that the target audience comprises males between the ages of 18-35, the first type of content may comprise a sporting event such as a football game. Determining the first type of content may comprise determining a particular airing of the first type of content, such as a football game between the times of 1 PM and 4 PM on a particular Sunday. Determining a first type of content associated with the target audience may comprise determining a first genre of content that is frequently viewed by the target audience. The server may be configured to analyze viewership information associated with the target audience and the particular demographics associated with the target audience in order to determine a particular genre that is frequently viewed by the target audience. The server may receive or access information associated with the target audience comprising males between the ages of 18-35 and may determine based on the information associated with the target audience that sporting events such as football are a popular viewing event associated with the target audience.

At step 206, output of the supplemental content may be caused. The supplemental content may be output during an output of the first type of content. Outputting the supplemental content during the first type of content may comprise outputting the supplemental content during a commercial portion in the first type of content. Outputting the supplemental content during the first type of content may comprise outputting the supplemental content as an overlay during output of the first type of content. The supplemental content may be output by one or more devices. The one or more devices may be associated with the target audience, such as set-top boxes, mobile phones, tablets, and personal computers associated with the target audience. The server may determine that the one or more devices associated with the target audience should output the supplemental content to the members of the target audience during a particular time frame. For example, the server may determine that a particular airing of a football game is from 1 PM to 4 PM on a particular Sunday. The server may cause the supplemental content (e.g., an advertisement for sports related merchandise) to be output to the members of the target audience while the one or more devices are outputting the first type of content (e.g., the football game).

In an example, viewership information associated with the supplemental content may be received. The viewership information may be received from one or more devices. The one or more devices may be associated with the target audience. The viewership information may be received from any number of the one or more devices associated with the target audience. The viewership information may comprise an indication of which devices output the supplemental content to the target audience. The viewership information may comprise an indication of which devices output the supplemental content for the first time. The viewership information may comprise an indication of which devices did not output the supplemental content to the target audience. The viewership information may comprise an indication of whether one or more particular audience members of the target audience viewed or likely viewed the supplemental content.

At step 208, a portion of the target audience that did not view the supplemental content may be determined. The portion of the target audience that did not view the supplemental content may be determined based on the viewership information. The viewership information may comprise an indication that the supplemental content was viewed by 70% of the target audience members. The server may determine that 30% of the target audience members did not view the supplemental content. The viewership information may directly indicate that 30% of the target audience members did not view the supplemental content. The viewership information may comprise an indication of a number or a percentage of the target audience members that did view the supplemental content, and the server may determine based on this information a portion of the target audience members that did not view the supplemental content, such as a number of target audience members that did not view the supplemental content or a percentage of the target audience members that did not view the supplemental content. Determining that the portion of the target audience did not view the supplemental content may comprise using a camera in the device (e.g., the set top box) in order to determine whether one or more viewers viewed the supplemental content. Determining that the portion of the target audience did not view the supplemental content may comprise receiving monitoring information from the one or more devices. The one or more devices may enable or give permission for the system to monitor the output of the devices in order to determine whether or not the supplemental content was viewed.

At step 210, a second type of content associated with the portion of the target audience may be determined. The second type of content may be determined based on one or more characteristics of the entirety of the target audience and/or one or more characteristics of the portion of the target audience. The viewership information may be received from one or more devices. The one or more devices may be associated with the portion of the target audience, such as set-top boxes, mobile phones, tablets, and personal computers associated with the portion of the target audience.

Determining a second type of content associated with the portion of the target audience may comprise determining a second type of content that is likely to be viewed by the portion of the target audience. Based on data associated with the portion of the target audience, the server may determine that the portion of the target audience (e.g., the 30% of the target audience that did not view the supplemental content during the output of the first type of content) is likely to view a second type of content that may be different from the first type of content. The second type of content may comprise a television show such as "Walking Dead." The second type of content may be determined based on viewership information associated with the portion of the target audience.

Determining the second type of content associated with the portion of the target audience may comprise determining a second genre of content that is frequently viewed by the portion of the target audience. The server may be configured to analyze viewership information associated with the portion of the target audience and/or the particular demographics associated with the portion of the target audience in order to determine a particular genre that is frequently viewed by the portion of the target audience. The server may receive or access information associated with the portion of the target audience and may determine based on the information associated with the portion of the target audience that this demographic typically watches "Walking Dead" on Sunday nights.

At step 212, output of the supplemental content may be caused. The supplemental content may be output during an output of the second type of content. Outputting the supplemental content during an output of the second type of content may comprise outputting the supplemental content during a commercial portion in the second type of content. Outputting the supplemental content during the second type of content may comprise outputting the supplemental content as an overlay during output of the second type of content. The supplemental content may be output by one or more devices. The one or more devices may be associated with the target audience, such as set-top boxes, mobile phones, tablets, and personal computers associated with the target audience. The server may determine that the one or more devices associated with the target audience should output the supplemental content to the members of the target audience during a particular time frame. For example, the server may determine that a particular airing of a football game is from 1 PM to 4 PM on a particular Sunday. The server may cause the supplemental content (e.g., an advertisement for sports related merchandise) to be output to the members of the target audience while the one or more devices are outputting the first type of content (e.g., the football game).

The server may determine that a rate of new exposures for the supplemental content is below a threshold. The rate of new exposures for the supplemental content may be based on a desired number of new exposures for the supplemental content or a percentage of a particular demographic for viewing the supplemental content. Determining that the rate of new exposures for the supplemental content is below a threshold may comprise determining a number of devices that have output the supplemental content for the first time is below the threshold. The server may determine that it is desirable to expose 80% of the target audience to the supplemental content. The server may determine that only 70% of the target audience has viewed the supplemental content, and thus, that the supplemental content should be output to the particular demographic during another type of content associated with that demographic. However, if it is determined that 90% of the target audience viewed the supplemental content during the output of the first type of content, the server may not need to determine a second type of content during which the supplemental content will be output.

The server may determine that a number of repeat exposures of the supplemental content by the target audience has reached a threshold. For example, the server may determine that the supplemental content has been viewed by one or more members of the target audience more times than a threshold amount. This may not be desirable as an audience member may not be more likely to be interested in an advertisement after it has been viewed a certain number of times. Based on determining that the number of repeat exposures of the supplemental content has reached a threshold, the server may determine to cease sending the indication to the one or more devices associated with the target audience to output the supplemental content to the target audience. Additionally or alternatively, the server may determine to output the supplemental content during one or more other types of content in order to increase the likelihood that the content will be viewed by one or more new (e.g., non-repeat) audience members.

The server may additionally or alternatively determine whether a threshold number of exposures has been reached based on a plurality of different viewing platforms. The server may output the supplemental content to the target audience using one or more different viewing platforms. The server may determine that the supplemental content has been output for the threshold number of times only when the supplemental content has been output a certain number of times on a first viewing platform and a certain number of times on one or more other viewing platforms. For example, the server may determine that the supplemental content has been output the threshold number of times only when the supplemental content has been output to the target audience via a set-top box at least four times, via a mobile telephone at least two times and via a tablet at least one time.

Figure 3:
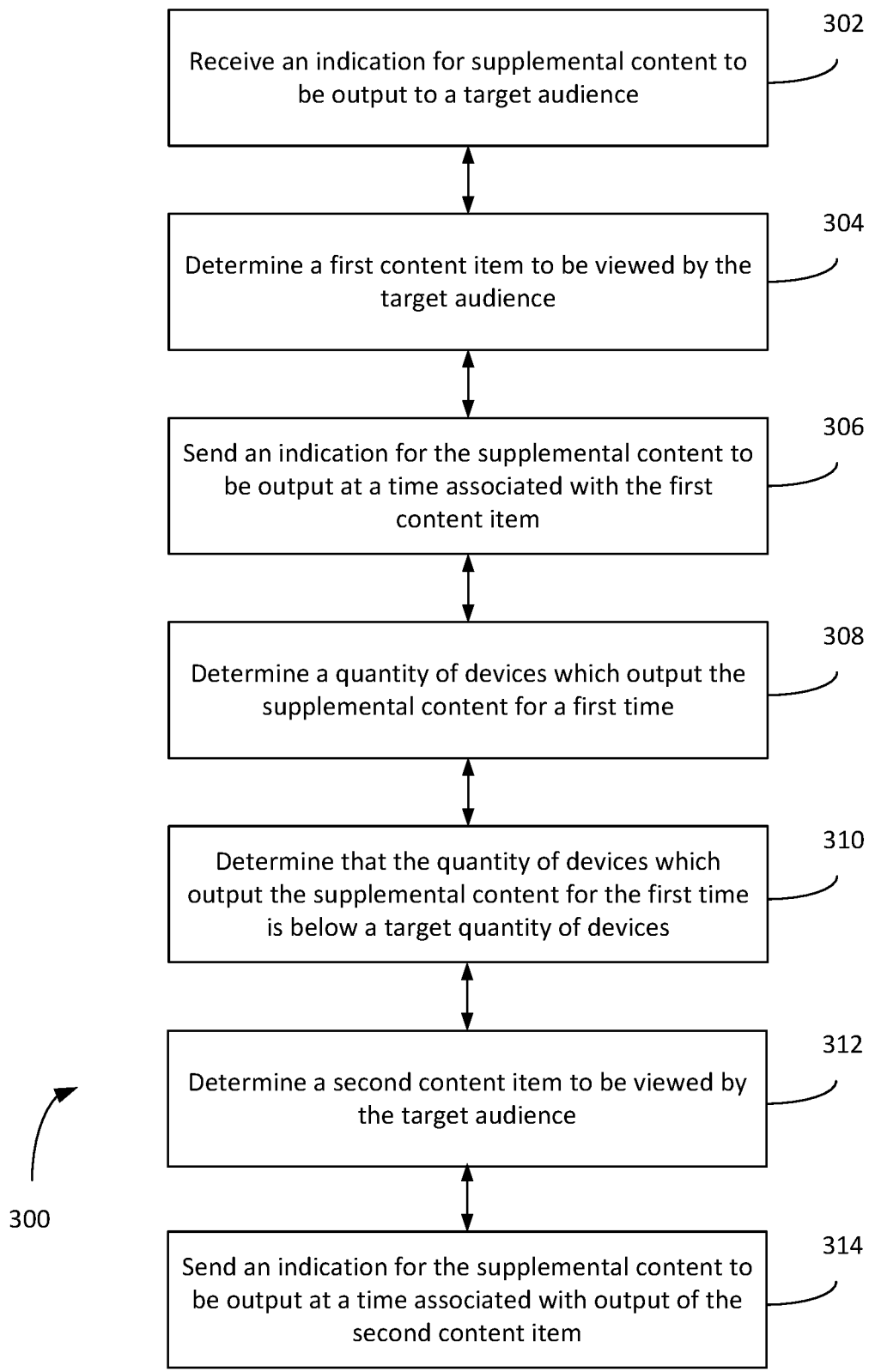
FIG. 3 shows a flow chart of an example method.

FIG. 3 shows a flow chart of an example method 300. At step 302, an indication for supplemental content to be output may be received. The indication may be an indication for the supplemental content to be output to a target audience. The supplemental content may comprise advertising content. For example, the supplemental content may comprise an advertisement for selling sports related merchandise such as football jerseys. The supplemental content may comprise overlay content. For example, the supplemental content may comprise overlay content that identifies certain features of other content that is being played back concurrently with the supplemental content, such as an identifier of a song or of a location in the other content.

At step 304, a first content item to be viewed by the target audience may be determined. The first content item may be determined based on at least one characteristic associated with the target audience. The first content item may be determined based on viewership information associated with the target audience. The viewership information may be received from one or more devices. The devices may be associated with the target audience, such as set-top boxes, mobile phones, tablets, and personal computers associated with the target audience. The viewership information may be determined based on stored information associated with the target audience. The viewership information may be determined based on any data associated with the target audience, including but not limited to data received from third parties.

Determining a first content item may comprise determining a first content item that is likely to be viewed by the target audience. In an example that the target audience comprises males between the ages of 18-35, the first content item may comprise a sporting event such as a football game. Determining the first content item may comprise determining a particular airing of the first content item, such as a football game between the times of 1 PM and 4 PM on a particular Sunday. Determining a first content item associated with the target audience may comprise determining a first genre of content that is frequently viewed by the target audience. The server may be configured to analyze viewership information associated with the target audience and the particular demographics associated with the target audience in order to determine a particular genre that is frequently viewed by the target audience. The server may receive or access information associated with the target audience comprising males between the ages of 18-35 and may determine based on the information associated with the target audience that sporting events such as football are a popular viewing event associated with the target audience.

At step 306, an indication for the supplemental content to be output may be sent. The indication for the supplemental content to be output may comprise an indication for the supplemental content to be output at a time associated with output of the first content item. Sending an indication for the supplemental content to be output at a time associated with output of the first content item may comprise sending an indication for the supplemental content to be output during a commercial portion in the first content item. Sending an indication for the supplemental content to be output at a time associated with output of the first content item may comprise sending an indication for the supplemental content to be output as an overlay during output of the first content item. The supplemental content may be output by one or more devices. The one or more devices may be associated with the target audience, such as set-top boxes, mobile phones, tablets, and personal computers associated with the target audience. The server may determine that the supplemental content should be output to the target audience during a particular time frame. For example, the server may determine that a particular airing of a football game is from 1 PM to 4 PM on a particular Sunday. The server send an indication for the supplemental content (e.g., an advertisement for sports related merchandise) to be output to the target audience while the one or more devices are outputting the first content item (e.g., the football game).

At step 308, a quantity of devices which output the supplemental content for a first time during a first period of time may be determined. The server may be configured to monitor the one or more devices and to determine which devices are outputting the supplemental content for a first time. As described below in connection with FIGS. 4A and 4B, the number of devices which output the supplemental content for a first time may increase as the supplemental content first becomes available. However, as time passes since the supplemental content is first aired, less devices may output the supplemental content for a first time because the devices either are not likely to tune to the first content for viewing the supplemental content or have already output the supplemental content for a first time.

At step 310, it may be determined that the quantity of devices is below a target quantity of devices to output the supplemental content. The determination may be based on the quantity of devices which output the supplemental content for the first time during the first time period. The server may determine that it is desirable to expose 80% of the target audience to the supplemental content. The server may determine that only 60% of the devices associated with the target audience has output the supplemental content. Thus, the server may determine that the supplemental content should be output to the target audience during another type of content associated with the target audience.

Determining that the target audience did not view the supplemental content may comprise receiving or accessing viewership information associated with the target audience. The viewership information associated with the target audience may be accessed or received from the one or more devices associated with the target audience. Determining that the target audience did not view the supplemental content may comprise using a camera in the device (e.g., the set top box) in order to determine whether one or more viewers viewed the supplemental content. Determining that the portion of the target audience did not view the supplemental content may comprise receiving monitoring information from the one or more devices. The one or more devices may enable or give permission for the system to monitor the output of the devices in order to determine whether or not the supplemental content was viewed.

At step 312, a second content item to be viewed by the target audience may be determined. The second content item to be viewed by the target audience may be determined based on the quantity of devices being below the target quantity of devices for viewing the supplemental content. The second content item may be determined based on one or more characteristics of the target audience.

Determining a second content item associated with the target audience may comprise determining a second content item that is likely to be viewed by the target audience. Based on data associated with the target audience, the server may determine that the target audience is likely to view a second content item that may be different from the first content item. The second content item may comprise a television show such as "The Walking Dead." Determining the second content item associated with the target audience may comprise determining a second genre of content that is frequently viewed by the target audience. The server may be configured to analyze viewership information associated with the target audience and/or the particular demographics associated with the target audience in order to determine a particular genre that is frequently viewed by the target audience. The server may receive or access information associated with the target audience and may determine based on the information associated with the target audience that this demographic typically watches "The Walking Dead" on Sunday nights.

At step 314, output of the supplemental content may be caused. The supplemental content may be output at a time associated with output of a second content item. Outputting the supplemental content during an output of the second content item may comprise outputting the supplemental content during a commercial portion in the second content item. Outputting the supplemental content during the second content item may comprise outputting the supplemental content as an overlay during output of the second content item. The supplemental content may be output by one or more devices. The one or more devices may be associated with the target audience, such as set-top boxes, mobile phones, tablets, and personal computers associated with the target audience. The server may determine that the one or more devices associated with the target audience should output the supplemental content to the target audience during a particular time frame. For example, the server may determine that a particular airing of "The Walking Dead" is from 8 PM to 9 PM on a particular Wednesday. The server may cause the supplemental content (e.g., an advertisement for sports related merchandise) to be output to the target audience while the one or more devices are outputting the second content item (e.g., "The Walking Dead").

Figure 4B:
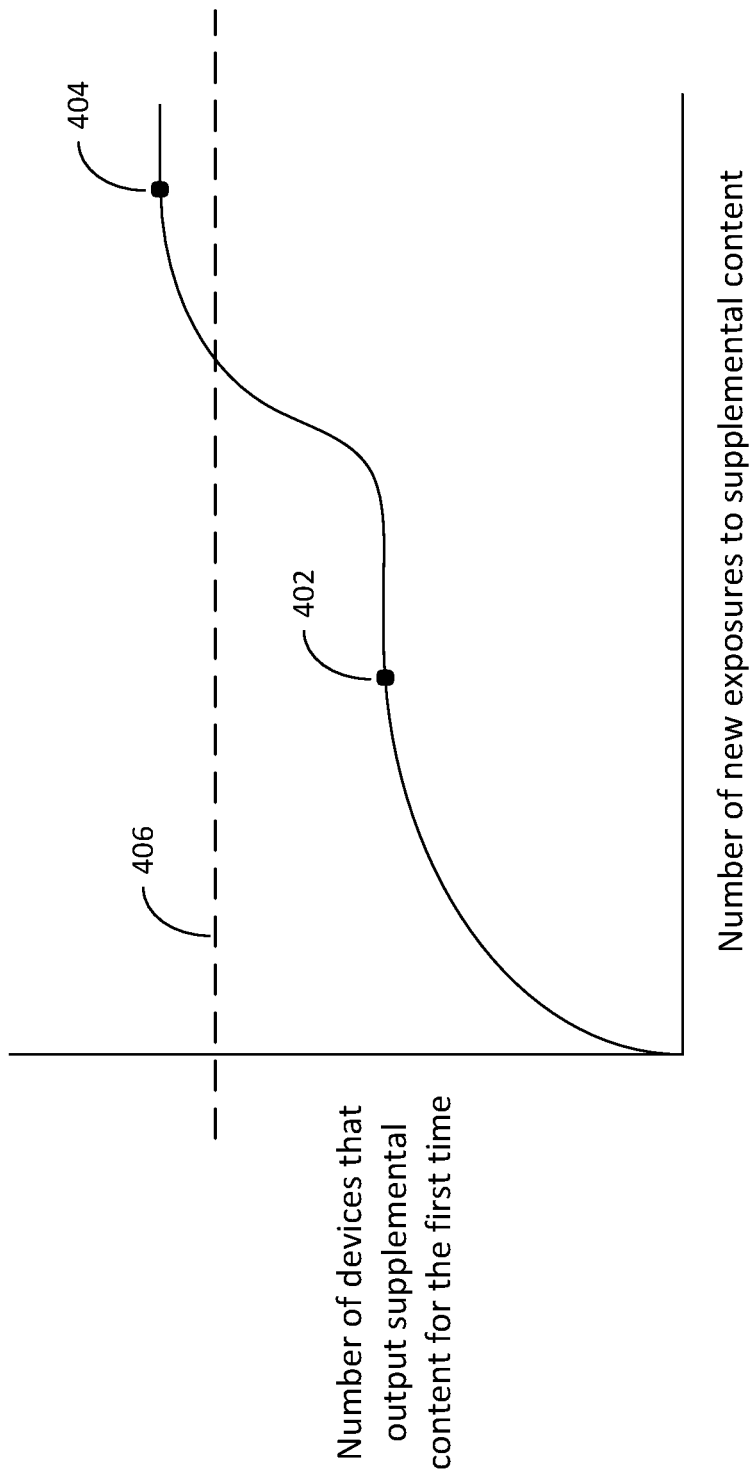

FIGS. 4A and 4B show example graphs in accordance with an aspect of the disclosure. The graph shown in FIG. 4A represents the number of exposures to supplemental content as a function of the number of devices that output the supplemental content for the first time. As shown, the number of exposures to the supplemental content may initially grow rapidly with the number of devices that output the supplemental content. This may be a result of the devices outputting the supplemental content for the first time. This may be desirable as it may lead to a larger number of unique exposures. However, as time progresses, the number of exposures to the supplemental content may begin to flatten out (e.g., as shown at point 402) with respect to the number of devices that output the supplemental content. This may occur as a result that the same devices may be constantly outputting the supplemental content to the same viewers. This may be undesirable for a number of reasons. The likelihood of a viewer performing an action after viewing supplemental content (e.g., purchasing a football jersey based on viewing a commercial) may be high upon the initial viewing of the supplemental content. However, after the viewer has seen the supplemental content a threshold number of times, and the viewer has not yet performed an action, it is not likely that continuing to display this supplemental content to the viewer is going to have an effect.

As shown in FIG. 4B, displaying the supplemental content to another audience segment such as during another type of content may lead to an increase in the number of exposures to the supplemental content. Eventually, the number of first-time exposures of the supplemental content during the display of the second content item may also begin to flatten out (e.g., as shown at point 404). However, since the supplemental content has been viewed a threshold number of times, as shown at threshold 406, the advertising campaign may be determined to be successful. The threshold 406 may represent a number of users or percentage of users for viewing the supplemental content. However, if the threshold 406 is not reached, the supplemental content may be displayed during one or more other types of content until the threshold is reached.

Figure 5:
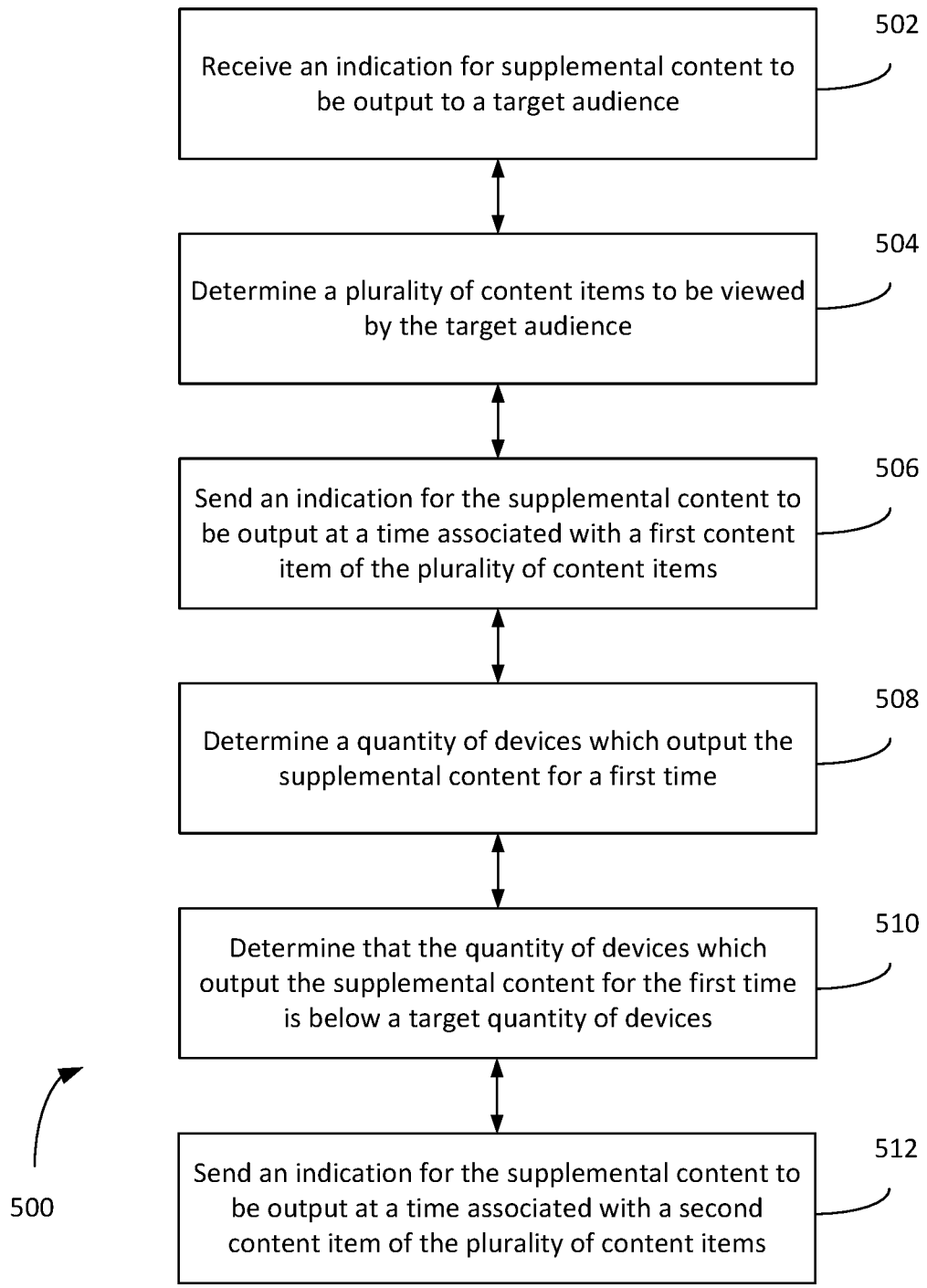
FIG. 5 shows a flow chart of an example method.

FIG. 5 shows a flow chart of an example method 500. At step 502, an indication for supplemental content to be output may be received. The indication may be an indication for the supplemental content to be output to a target audience. The supplemental content may comprise advertising content. For example, the supplemental content may comprise an advertisement for selling sports related merchandise such as football jerseys. The supplemental content may comprise overlay content. For example, the supplemental content may comprise overlay content that identifies certain features of other content that is being played back concurrently with the supplemental content, such as an identifier of a song or of a location in the other content.

At step 504, a plurality of content items to be viewed by the target audience may be determined. The plurality of content items may be determined based on at least one characteristic associated with the target audience. The plurality of content items may comprise at least a first content item and a second content item. The plurality of content items may be determined based on viewership information associated with the target audience. The viewership information may be received from one or more devices. The devices may be associated with the target audience, such as set-top boxes, mobile phones, tablets, and personal computers associated with the target audience. The viewership information may be determined based on stored information associated with the target audience. The viewership information may be determined based on any data associated with the target audience, including but not limited to data received from third parties.

Determining the plurality of content items may comprise determining a first content item that is likely to be viewed by the target audience. In an example that the target audience comprises males between the ages of 18-35, the first content item may comprise a sporting event such as a football game. Determining the first content item may comprise determining a particular airing of the first content item, such as a football game between the times of 1 PM and 4 PM on a particular Sunday. Determining a first content item associated with the target audience may comprise determining a first genre of content that is frequently viewed by the target audience. The server may be configured to analyze viewership information associated with the target audience and the particular demographics associated with the target audience in order to determine a particular genre that is frequently viewed by the target audience. The server may receive or access information associated with the target audience comprising males between the ages of 18-35 and may determine based on the information associated with the target audience that sporting events such as football are a popular viewing event associated with the target audience.

Determining the plurality of content items may comprise determining a second content item that is likely to be viewed by the target audience. Based on data associated with the target audience, the server may determine that the target audience is likely to view a second content item that may be different from the first content item. The second content item may comprise a television show such as "The Walking Dead." Viewership information associated with the target audience may be received from the one or more devices associated with the target audience. Determining the second content item associated with the target audience may comprise determining a second genre of content that is frequently viewed by the target audience. The server may be configured to analyze viewership information associated with the target audience in order to determine a particular genre of content that is frequently viewed by the target audience. The server may receive or access information associated with the target audience and may determine based on the information associated with the target audience that the target audience typically watches "The Walking Dead" on Sunday nights.

At step 506, an indication for the supplemental content to be output may be sent. The indication for the supplemental content to be output may comprise an indication for the supplemental content to be output at a time associated with output of the first content item. Sending an indication for the supplemental content to be output at a time associated with output of the first content item may comprise sending an indication for the supplemental content to be output during a commercial portion in the first content item. Sending an indication for the supplemental content to be output at a time associated with output of the first content item may comprise sending an indication for the supplemental content to be output as an overlay during output of the first content item. The supplemental content may be output by one or more devices. The one or more devices may be associated with the target audience, such as set-top boxes, mobile phones, tablets, and personal computers associated with the target audience. The server may determine that the supplemental content should be output to the target audience during a particular time frame. For example, the server may determine that a particular airing of a football game is from 1 PM to 4 PM on a particular Sunday. The server send an indication for the supplemental content (e.g., an advertisement for sports related merchandise) to be output to the target audience while the one or more devices are outputting the first content item (e.g., the football game).

At step 508, a quantity of devices which output the supplemental content for a first time during a first period of time may be determined. The server may be configured to monitor the one or more devices and to determine which devices are outputting the supplemental content for a first time. As described in connection with FIGS. 4A and 4B, the number of devices which output the supplemental content for a first time may increase as the supplemental content first becomes available. However, as time passes since the supplemental content is first aired, less devices may output the supplemental content for a first time because the devices either are not likely to tune to the first content for viewing the supplemental content or have already output the supplemental content for a first time.

At step 510, it may be determined that the quantity of devices is below a target quantity of devices to output the supplemental content. The determination may be based on the quantity of devices which output the supplemental content for the first time during the first time period. The server may determine that it is desirable to expose 80% of the target audience to the supplemental content. The server may determine that only 60% of the devices associated with the target audience has output the supplemental content. Thus, the server may determine that the supplemental content should be output to the target audience during another type of content associated with the target audience.

Determining that the target audience did not view the supplemental content may comprise receiving or accessing viewership information associated with the target audience. The viewership information associated with the target audience may be accessed or received from the one or more devices associated with the target audience. Determining that the target audience did not view the supplemental content may comprise using a camera in the device (e.g., the set top box) in order to determine whether one or more viewers viewed the supplemental content. Determining that the portion of the target audience did not view the supplemental content may comprise receiving monitoring information from the one or more devices. The one or more devices may enable or give permission for the system to monitor the output of the devices in order to determine whether or not the supplemental content was viewed.

At step 512, output of the supplemental content may be caused at a time associated with output of a second content item. Outputting the supplemental content during an output of the second content item may comprise outputting the supplemental content during a commercial portion in the second content item. Outputting the supplemental content during the second content item may comprise outputting the supplemental content as an overlay during output of the second content item. The supplemental content may be output by one or more devices. The one or more devices may be associated with the target audience, such as set-top boxes, mobile phones, tablets, and personal computers associated with the target audience. The server may determine that the one or more devices associated with the target audience should output the supplemental content to the target audience during a particular time frame. For example, the server may determine that a particular airing of "The Walking Dead" is from 8 PM to 9 PM on a particular Wednesday. The server may cause the supplemental content (e.g., an advertisement for sports related merchandise) to be output to the target audience while the one or more devices are outputting the second content item (e.g., "The Walking Dead").

Figure 6:
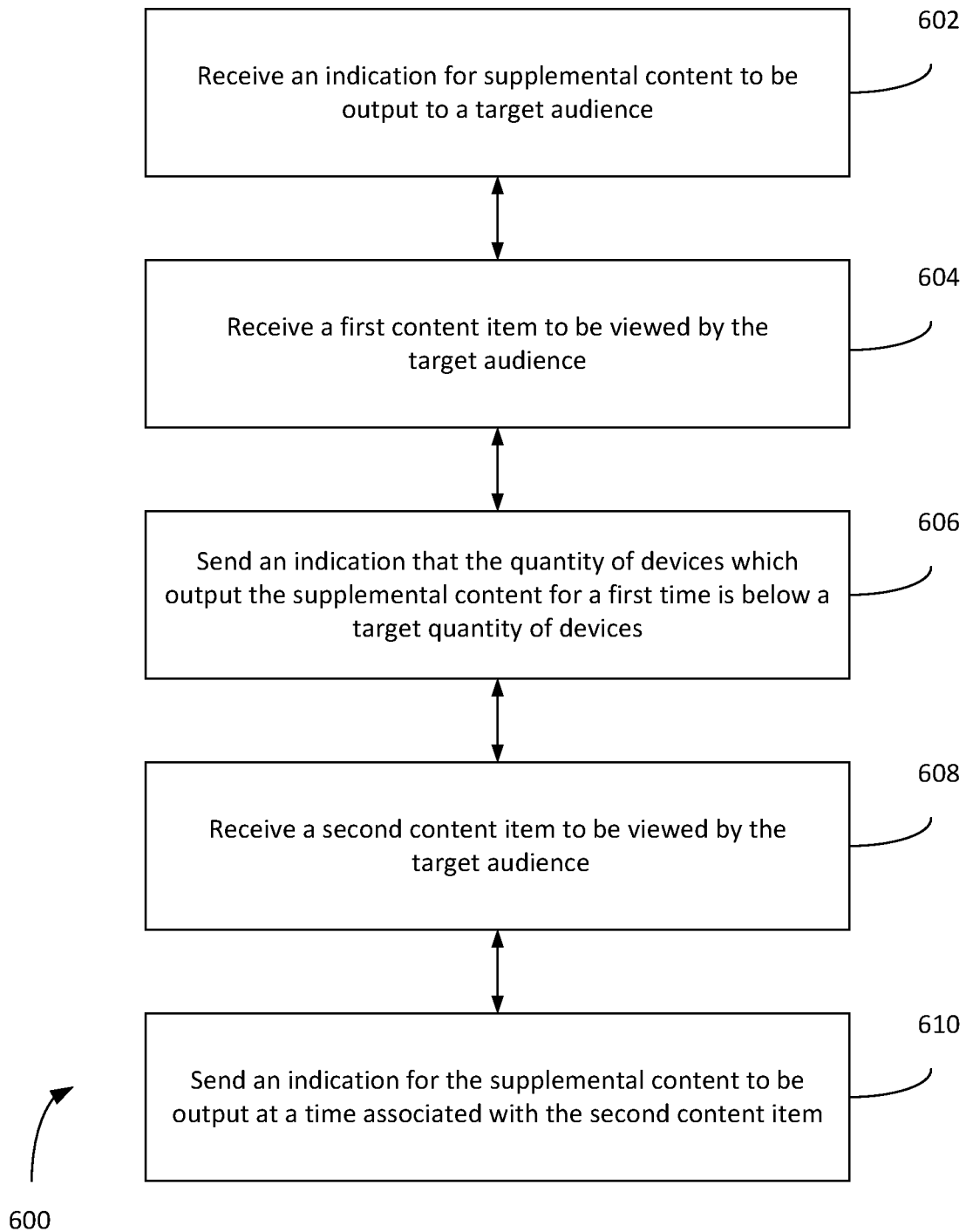
FIG. 6 shows a flow chart of an example method.

FIG. 6 shows a flow chart of an example method 600. At step 602, an indication for supplemental content to be output may be received. The indication may be an indication for the supplemental content to be output to a target audience. The supplemental content may comprise advertising content. For example, the supplemental content may comprise an advertisement for selling sports related merchandise such as football jerseys. The supplemental content may comprise overlay content. For example, the supplemental content may comprise overlay content that identifies certain features of other content that is being played back concurrently with the supplemental content, such as an identifier of a song or of a location in the other content.

At step 604, a first content item to be viewed by the target audience may be received. The first content item may be received based on at least one characteristic associated with the target audience. Receiving the first content item may comprise receiving a first content item that is likely to be viewed by the target audience. In an example that the target audience comprises males between the ages of 18-35, the first content item may comprise a sporting event such as a football game. Receiving a first content item associated with the target audience may comprise receiving a first genre of content that is frequently viewed by the target audience. The server may be configured to analyze viewership information associated with the target audience and the particular demographics associated with the target audience in order to determine a particular genre that is frequently viewed by the target audience. The server may receive or access information associated with the target audience comprising males between the ages of 18-35 and may determine based on the information associated with the target audience that sporting events such as football are a popular viewing event associated with the target audience.

At step 606, it may be determined that the quantity of devices is below a target quantity of devices to output the supplemental content. A quantity of devices which output the supplemental content for a first time during a first period of time may be determined. The server may be configured to monitor the one or more devices and to determine which devices are outputting the supplemental content for a first time. As described in connection with FIGS. 4A and 4B, the number of devices which output the supplemental content for a first time may increase as the supplemental content first becomes available. However, as time passes since the supplemental content is first aired, less devices may output the supplemental content for a first time because the devices either are not likely to tune to the first content for viewing the supplemental content or have already output the supplemental content for a first time.

The determination that the quantity of devices is below a target quantity of devices to output the supplemental content may be based on the quantity of devices which output the supplemental content for the first time during the first time period. The server may determine that it is desirable to expose 80% of the target audience to the supplemental content. The server may determine that only 60% of the devices associated with the target audience has output the supplemental content. Thus, the server may determine that the supplemental content should be output to the target audience during another type of content associated with the target audience.

Determining that the target audience did not view the supplemental content may comprise receiving or accessing viewership information associated with the target audience. The viewership information associated with the target audience may be accessed or received from the one or more devices associated with the target audience. Determining that the target audience did not view the supplemental content may comprise using a camera in the device (e.g., the set top box) in order to determine whether one or more viewers viewed the supplemental content. Determining that the portion of the target audience did not view the supplemental content may comprise receiving monitoring information from the one or more devices. The one or more devices may enable or give permission for the system to monitor the output of the devices in order to determine whether or not the supplemental content was viewed.

At step 608, a second content item to be viewed by the target audience may be received. The second content item to be viewed by the target audience may be received based on the quantity of devices being below the target quantity of devices for viewing the supplemental content. The second content item may be received based on one or more characteristics of the target audience. Receiving a second content item associated with the target audience may comprise receiving a second content item that is likely to be viewed by the target audience. Based on data associated with the target audience, the server may determine that the target audience is likely to view a second content item that may be different from the first content item. The second content item may comprise a television show such as "The Walking Dead." Receiving the second content item associated with the target audience may comprise receiving a second genre of content that is frequently viewed by the target audience. The server may be configured to analyze viewership information associated with the target audience and/or the particular demographics associated with the target audience in order to determine a particular genre that is frequently viewed by the target audience. The server may receive or access information associated with the target audience and may determine based on the information associated with the target audience that this demographic typically watches "The Walking Dead" on Sunday nights.

At step 610, output of the supplemental content may be caused. The supplemental content may be output at a time associated with output of a second content item. Outputting the supplemental content during an output of the second content item may comprise outputting the supplemental content during a commercial portion in the second content item. Outputting the supplemental content during the second content item may comprise outputting the supplemental content as an overlay during output of the second content item. The supplemental content may be output by one or more devices. The one or more devices may be associated with the target audience, such as set-top boxes, mobile phones, tablets, and personal computers associated with the target audience. The server may determine that the one or more devices associated with the target audience should output the supplemental content to the target audience during a particular time frame. For example, the server may determine that a particular airing of "The Walking Dead" is from 8 PM to 9 PM on a particular Wednesday. The server may cause the supplemental content (e.g., an advertisement for sports related merchandise) to be output to the target audience while the one or more devices are outputting the second content item (e.g., "The Walking Dead").

Figure 7:
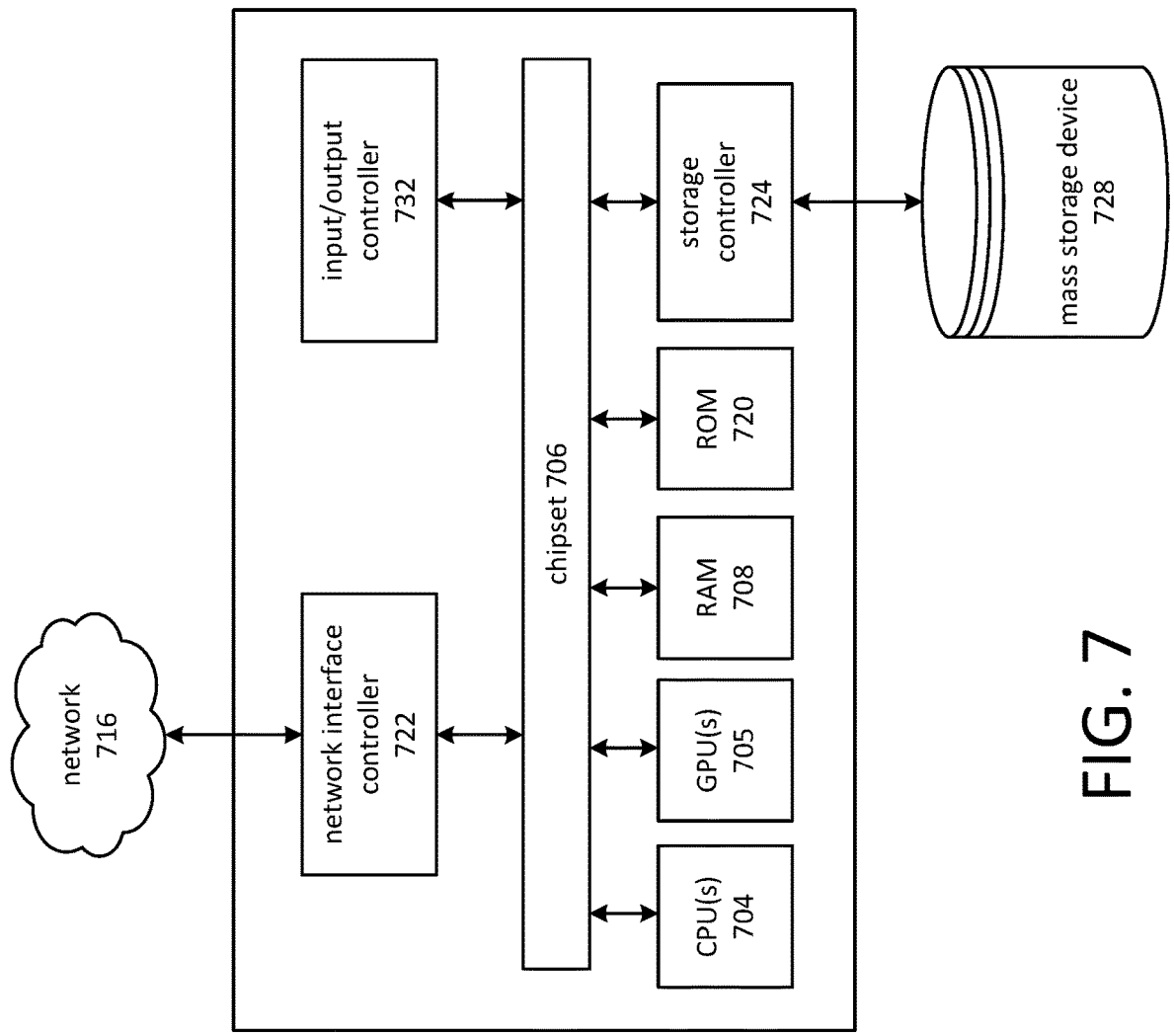
FIG. 7 shows a block diagram of an example computing device.

FIG. 7 depicts a computing device that may be used in various aspects, such as the servers, modules, and/or devices depicted in FIG. 1. With regard to the example architecture of FIG. 1, the server 102, the supplemental content component 104, the content component 106, the device 110, the display 112, the speaker 114 and/or the monitoring component 116 may each be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 2, 3, 5 and 6.

The computing device 700 may include a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as GPU(s) 705. The GPU(s) 705 may comprise processing units specialized for but not necessarily limited to highly parallel computations, such as graphics and other visualization-related processing.

A user interface may be provided between the CPU(s) 704 and the remainder of the components and devices on the baseboard. The interface may be used to access a random access memory (RAM) 708 used as the main memory in the computing device 700. The interface may be used to access a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the aspects described herein. The user interface may be provided by a one or more electrical components such as the chipset 706.

The computing device 700 may operate in a networked environment using logical connections to remote computing nodes and computer systems through local area network (LAN) 716. The chipset 706 may include functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a storage device 728 that provides non-volatile storage for the computer. The storage device 728 may store system programs, application programs, other program modules, and data, which have been described in greater detail herein. The storage device 728 may be connected to the computing device 700 through a storage controller 724 connected to the chipset 706. The storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 728 is characterized as primary or secondary storage and the like.

For example, the computing device 700 may store information to the storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the storage device 728 by detecting the physical states or characteristics of one or more particular locations within the physical storage units.

In addition to the storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 728 may store other system or application programs and data utilized by the computing device 700.

The storage device 728 or other computer-readable storage media may also be encoded with computer-executable instructions, which, when loaded into the computing device 700, transforms the computing device from a general-purpose computing system into a special-purpose computer capable of implementing the aspects described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 2, 3, 5 and 6.

A computing device, such as the computing device 700 depicted in FIG. 7, may also include an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not include all of the components shown in FIG. 7, may include other components that are not explicitly shown in FIG. 7, or may utilize an architecture completely different than that shown in FIG. 7.

As described herein, a computing device may be a physical computing device, such as the computing device 700 of FIG. 7. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed:

1. A method comprising:
   determining first content associated with at least one consumer characteristic;
   sending an indication for supplemental content to be output with output of the first content;
   receiving information indicating that one or more devices output the supplemental content via a plurality of platforms during output of the first content;

determining whether a quantity of the one or more devices that output the supplemental content for a first time during the output of the first content satisfies a threshold;

determining, based on the quantity of the one or more devices that output the supplemental content for the first time during the output of the first content not satisfying the threshold, second content associated with the at least one consumer characteristic; and sending an indication for the supplemental content to be output with output of the second content.

2. The method of claim 1, further comprising:

ceasing, based on the quantity of the one or more devices that output the supplemental content for the first time during the output of the first content satisfying the threshold, to send the indication for the supplemental content to be output with output of the first content.

3. The method of claim 1, further comprising receiving the indication of the supplemental content associated with the at least one consumer characteristic.

4. The method of claim 1, wherein determining the first content associated with the at least one consumer characteristic comprises determining the first content associated with at least one demographic profile of a consumer.

5. The method of claim 1, wherein the supplemental content comprises an advertisement or metadata.

6. The method of claim 1, wherein the supplemental content is to be output as an overlay during output of the first content and the second content.

7. The method of claim 1, wherein the supplemental content is to be output within a portion during output of the first content and within a portion during output of the second content.

8. The method of claim 1, wherein the information, indicating that the one or more devices output the supplemental content via the plurality of platforms, indicates the plurality of platforms via which the supplemental content was output.

9. The method of claim 1, wherein the plurality of platforms comprise at least two of: a set-top-box, a mobile phone, a tablet, a personal computer, a viewing platform, a platform for output to a set-top-box, a platform for output to a mobile phone, a platform for output to a tablet, a platform for output to a personal computer.

10. The method of claim 1, wherein the at least one consumer characteristic comprises at least one of age, race, or gender.

11. The method of claim 1, wherein receiving the information indicating that the one or more devices output the supplemental content via the plurality of platforms during output of the first content comprises:

receiving data indicating a first subset of the one or more devices that output the supplemental content during output of the first content via a first platform and a second subset of the one or more devices that output the supplemental content during output of the first content via a second platform.

12. A device comprising:

one or more processors; and memory storing computer executable instructions that, when executed by the one or more processors, cause the device to:

determine first content associated with at least one consumer characteristic;

send an indication for supplemental content to be output with output of the first content;

receiving information indicating that one or more devices output the supplemental content via a plurality of platforms during output of the first content;

determine whether a quantity of the one or more devices that output the supplemental content for a first time during the output of the first content satisfies a threshold;

determine, based on the quantity of the one or more devices that output the supplemental content for the first time during the output of the first content not satisfying the threshold, second content associated with the at least one consumer characteristic; and send an indication for the supplemental content to be output with output of the second content.

13. The device of claim 12, wherein the instructions, when executed, further cause the device to cease, based on the quantity of the one or more devices that output the supplemental content for the first time during the output of the first content satisfying the threshold, to send the indication for the supplemental content to be output with output of the first content.

14. The device of claim 12, wherein the instructions, when executed, further cause the device to receive the indication of the supplemental content associated with the at least one consumer characteristic.

15. The device of claim 12, wherein the instructions, when executed, cause the device to determine the first content associated with the at least one consumer characteristic by determining the first content associated with at least one demographic profile of a consumer.

16. The device of claim 12, wherein the supplemental content comprises an advertisement or metadata.

17. The device of claim 12, wherein the supplemental content is to be output as an overlay during output of the first content and the second content.

18. The device of claim 12, wherein the supplemental content is to be output within a portion during output of the first content and within a portion during output of the second content.

19. The device of claim 12, wherein the information, indicating that the one or more devices output the supplemental content via the plurality of platforms, indicates the plurality of platforms via which the supplemental content was output.

20. The device of claim 12, wherein the plurality of platforms comprise at least two of: a set-top-box, a mobile phone, a tablet, a personal computer, a viewing platform, a platform for output to a set-top-box, a platform for output to a mobile phone, a platform for output to a tablet, a platform for output to a personal computer.

21. A non-transitory computer-readable medium storing instructions that, when executed, cause:

determining first content associated with at least one consumer characteristic;

sending an indication for supplemental content to be output with output of the first content;

receiving information indicating that one or more devices output the supplemental content via a plurality of platforms during output of the first content;

determining whether a quantity of the one or more devices that output the supplemental content for a first time during the output of the first content satisfies a threshold;

determining, based on the quantity of the one or more devices that output the supplemental content for the first time during the output of the first content not satisfying the threshold, second content associated with the at least one consumer characteristic; and sending an indication for the supplemental content to be output with output of the second content.

22. The non-transitory computer-readable medium of claim 21, wherein the instructions, when executed, further cause ceasing, based on the quantity of the one or more devices that output the supplemental content for the first time during the output of the first content satisfying the threshold, to send the indication for the supplemental content to be output with output of the first content.

23. The non-transitory computer-readable medium of claim 21, wherein the instructions, when executed, further cause receiving the indication of the supplemental content associated with the at least one consumer characteristic.

24. The non-transitory computer-readable medium of claim 21, wherein the instructions, when executed, cause determining the first content associated with the at least one consumer characteristic by determining the first content associated with at least one demographic profile of a consumer.

25. The non-transitory computer-readable medium of claim 21, wherein the supplemental content comprises an advertisement or metadata.

26. The non-transitory computer-readable medium of claim 21, wherein the supplemental content is to be output as an overlay during output of the first content and the second content.

27. The non-transitory computer-readable medium of claim 21, wherein the supplemental content is to be output within a portion during output of the first content and within a portion during output of the second content.

28. The non-transitory computer-readable medium of claim 21, wherein the information, indicating that the one or more devices output the supplemental content via the plurality of platforms indicates a plurality of different platforms via which the supplemental content was output.

29. The non-transitory computer-readable medium of claim 21, wherein the plurality of platforms comprise at least two of: a set-top-box, a mobile phone, a tablet, a personal computer, a viewing platform, a platform for output to a set-top-box, a platform for output to a mobile phone, a platform for output to a tablet, a platform for output to a personal computer.

30. A system comprising:
a second device; and
a device configured to:
determine first content associated with at least one consumer characteristic;
send an indication for supplemental content to be output with output of the first content;
receiving information indicating that one or more devices output the supplemental content via a plurality of platforms during output of the first content;
determine whether a quantity of the one or more devices that output the supplemental content for a first time during the output of the first content satisfies a threshold;
determine, based on the quantity of the one or more devices that output the supplemental content for the first time during the output of the first content not satisfying the threshold, second content associated with the at least one consumer characteristic; and
send an indication for the supplemental content to be output with output of the second content.

31. The system of claim 30, wherein the device is further configured to cease, based on the quantity of the one or more devices that output the supplemental content for the first time during the output of the first content satisfying the threshold, to send the indication for the supplemental content to be output with output of the first content.

32. The system of claim 30, wherein the device is further configured to receive the indication of the supplemental content associated with the at least one consumer characteristic.

33. The system of claim 30, wherein the device is configured to determine the first content associated with the at least one consumer characteristic by determining the first content associated with at least one demographic profile of a consumer.

34. The system of claim 30, wherein the supplemental content comprises an advertisement or metadata.

35. The system of claim 30, wherein the supplemental content is to be output as an overlay during output of the first content and the second content.

36. The system of claim 30, wherein the supplemental content is to be output within a portion during output of the first content and within a portion during output of the second content.

37. The system of claim 30, wherein the information, indicating that the one or more devices output the supplemental content via the plurality of platforms, indicates the plurality of platforms via which the supplemental content was output.

38. The system of claim 30, wherein the plurality of platforms comprise at least two of: a set-top-box, a mobile phone, a tablet, a personal computer, a viewing platform, a platform for output to a set-top-box, a platform for output to a mobile phone, a platform for output to a tablet, a platform for output to a personal computer.

* * * * *